R. E. SUCHOLTZ.
PLOW.
APPLICATION FILED OCT. 4, 1911.
1,024,534.
Patented Apr. 30, 1912.
3 SHEETS—SHEET 1.
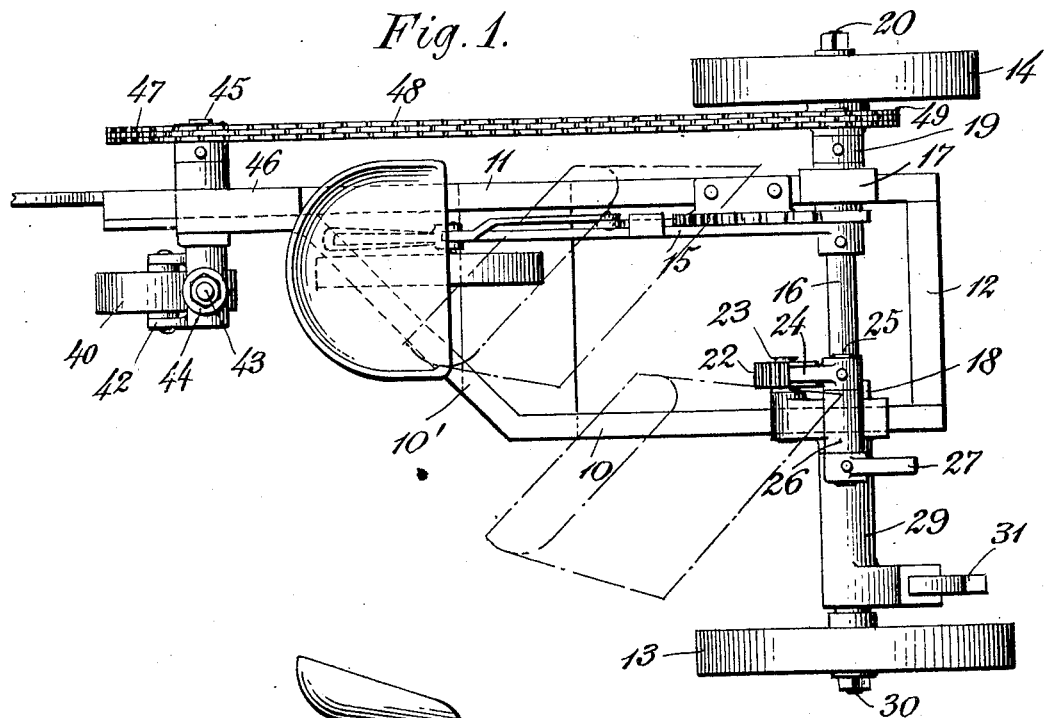
Fig. 1.
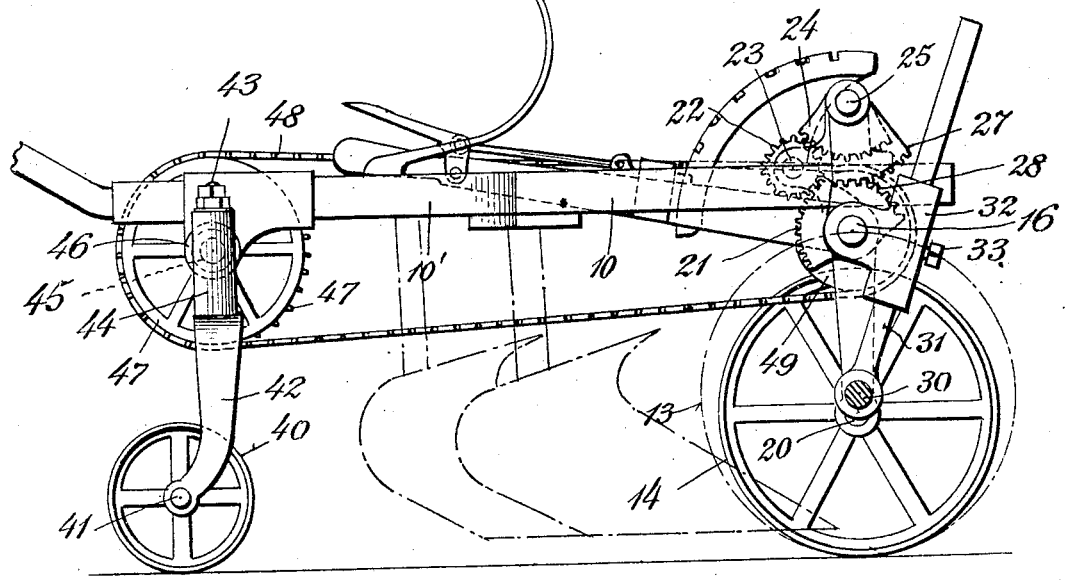
Fig. 2.
Witnesses
F. E. Ernst
A. M. Shannon
Inventor
Rudolph E. Sucholtz,
By 
Attorneys

R. E. SUCHOLTZ.
PLOW.
APPLICATION FILED OCT. 4, 1911.

1,024,534.

Patented Apr. 30, 1912.

3 SHEETS—SHEET 2.

Witnesses
F. E. Ernst
G. M. Shannon.

Inventor
Rudolph E. Sucholtz,

By
Attorneys

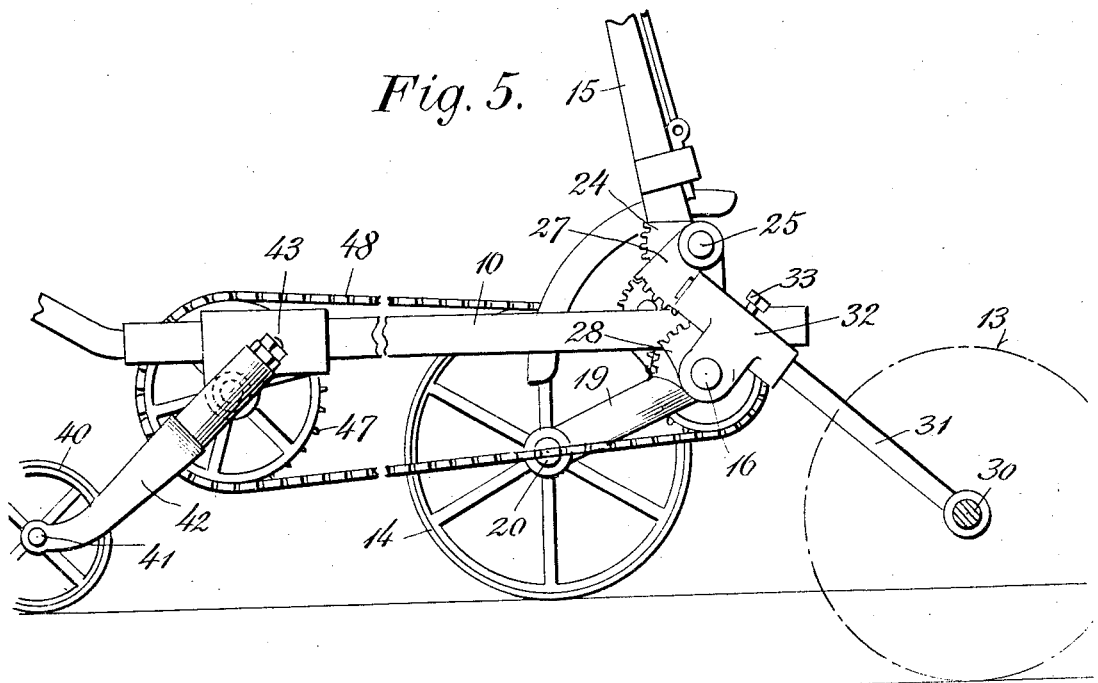
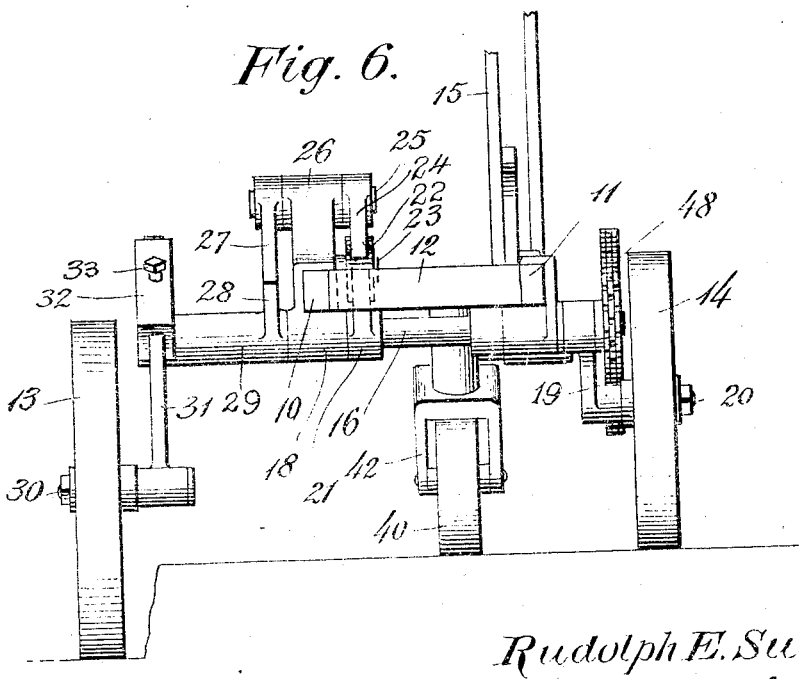

UNITED STATES PATENT OFFICE.

RUDOLPH E. SUCHOLTZ, OF DETROIT, MICHIGAN.

PLOW.

1,024,534. Specification of Letters Patent. Patented Apr. 30, 1912.

Application filed October 4, 1911. Serial No. 652,772.

*To all whom it may concern:*

Be it known that I, RUDOLPH E. SUCHOLTZ, a citizen of the United States of America, residing at Detroit, in the county of Wayne and State of Michigan, have invented certain new and useful Improvements in Plows, of which the following is a specification, reference being had therein to the accompanying drawings.

This invention relates to plows, and more especially to that class thereof, in which the share-carrying frame is supported on wheels, and it has for one of its objects the provision of improved means whereby the frame may be lowered relatively to the wheels to sink the shares into the ground, and vice versa, a single hand-lever being employed to control the various adjustments simultaneously.

Further objects of the invention will hereinafter appear and be particularly defined in the claims.

The invention has been clearly illustrated in the accompanying drawings, in which similar characters denote similar parts, and in which—

Figure 3:
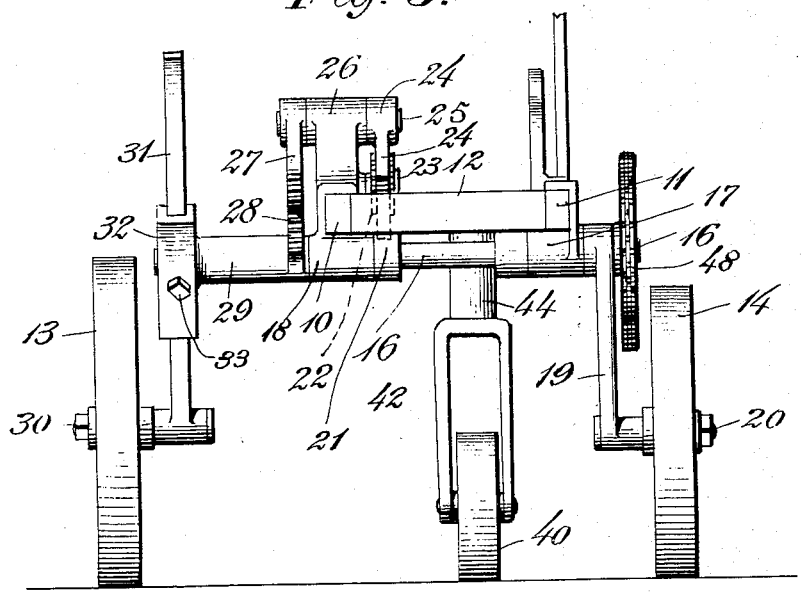
Figure 4:
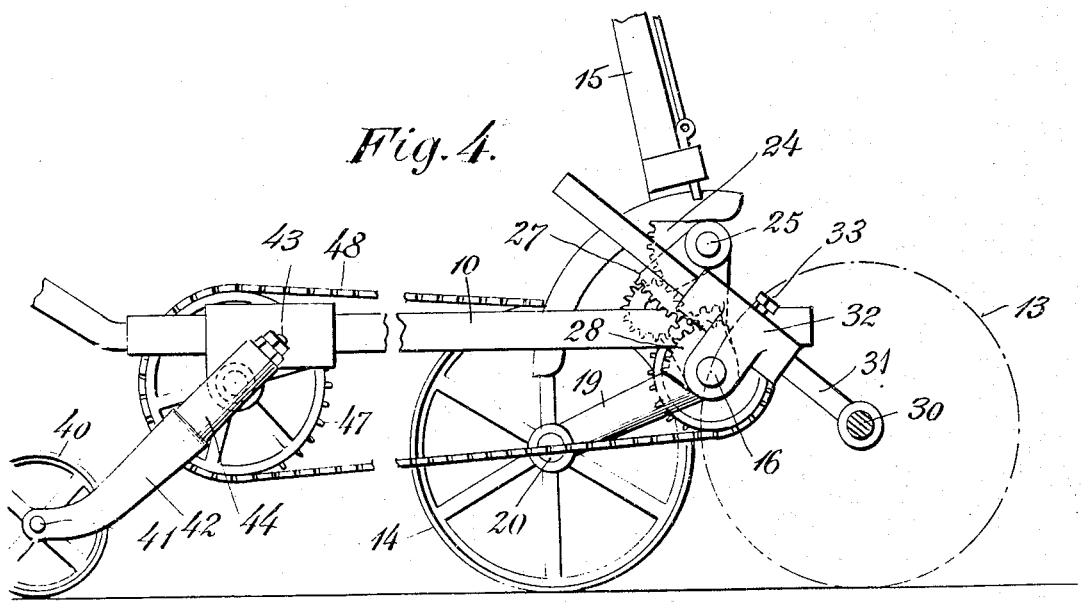

Figure 1 shows a top view of a plow embodying my invention; Fig. 2 is a side view thereof, the machine being in its raised or "traveling" condition; Fig. 3 shows a front view of the machine, corresponding to Fig. 2; Fig. 4 is a side view illustrating the machine in condition to plow the first furrow; Fig. 5 is a similar view showing one of the ground-wheels adjusted to travel in the first furrow when the shares are plowing other furrows; and Fig. 6 is a front view corresponding to Fig. 5.

Briefly stated, the present invention constitutes an improvement in the plow shown in Letters Patent granted to me on February 16, 1897, and it consists in mounting the front wheels on the frame in such a manner that, when the frame is to be lowered, the wheels will be swung to opposite sides of a fulcrum-shaft which latter traverses the frame on a fixed axis. One of these front wheels may also be adjusted vertically so as to travel in the last completed furrow and therefore keep the frame level. After each subsequent furrow is completed the operator can (by a single lever) swing all the wheels downward, which movement results in raising the frame sufficiently to bring the plow-shares out of the ground and thus enable the machine to be turned around to face in the opposite direction, whereupon the lever is again moved to lower the frame and sink the shares into the ground.

Referring now to the drawings, the frame of the machine comprises a pair of side bars 10, 11, a front bar 12, and a rear cross bar 10' which preferably forms an integral part with the side bar 10. The front end of the frame is supported by a pair of wheels 13, 14, the latter being intended for travel on the level ground, while the former may also be adjusted vertically to travel in the furrow. Both wheels may be moved relatively to the frame, vertically and in unison by a single lever 15 secured to a cross-shaft 16 which is journaled in a plain bearing 17 on the bar 11 and in a bracket-bearing 18 secured to the bar 10. Adjacent the bearing 17 the shaft has an arm 19 which is provided at its lower free end with a trunnion 20 on which the ground-wheel 14 is journaled.

Secured to the end of the shaft 16 adjacent the bracket 18, is a sector 21 which meshes into a pinion 22 journaled on a stud 23 rigidly held in said bracket. This pinion is also engaged by an upper sector 24 which is secured to a short shaft or spindle 25 which is journaled in a bearing 26 formed on the bracket 18, and which also carries a sector 27 at the end opposite to the sector 24. The sector 27 is in engagement with a sector 28 secured upon a sleeve 29 which is journaled on the shaft 16 at the end thereof projecting beyond the bracket bearing 18.

From the foregoing it will be understood that when the lever 15 is swung upward from the position shown in Fig. 2 to that of Fig. 4, the small wheel 14 will swing rearward, while the sleeve 29 will be rotated in the opposite direction and therefore swing the large wheel 13 forward, the latter being journaled on a trunnion 30 carried by the lower end of a bar 31 which is adjustable in a lug 32 (preferably integral with the sleeve 29) as for instance by a set screw 33 to bring the machine frame to a level position, and also to provide for dropping the wheel into one furrow when the next furrow is being plowed, and yet maintaining the frame level, (see Fig. 5). After the second furrow has been plowed, and the machine is to be turned around to cut the third furrow on the return trip, the operator swings the lever back to its original position (shown in Fig. 2) which results in raising the frame and taking the shares out of the ground, it being understood however that the level condition of the frame will be destroyed owing to the lower position of the furrow-wheel but will be restored by re-lowering the frame to bring the shares into position to plow again when the furrow-wheel will travel in the furrow just made. The rear end of the frame is also controlled vertically for rising and falling movement simultaneous with the front end, and it is supported by a trailer-wheel 40 journaled in a spindle 41 which extends across the arms of a bifurcated support 42 provided with a shaft 43, the latter being journaled in a cross-head 44 formed on a horizontal shaft 45. This shaft is journaled in a bearing 46 secured to the frame and carries at its other end a sprocket 47 connected by a chain 48 with another sprocket 49 secured to the shaft 16 above referred to, so that when the latter is rotated to bring the ground wheel 14 into the position shown in Figs. 2 and 4, the trailer will also be moved to the extent necessary to preserve the frame substantially level, longitudinally.

Changes may be made in organization and the particular construction of some of the elements of my improved device, without departing from the spirit of the invention.

I claim:—

1. The combination with the frame, and a pair of ground-wheels for supporting one end thereof, of a shaft extending across said frame, an arm secured to said shaft and supporting one of said wheels, a sleeve loose on said shaft and supporting the other wheel, and means for rotating both, the shaft and sleeve, simultaneously and in opposite directions.

2. The combination with the frame, and a pair of ground-wheels for supporting one end thereof, of a shaft extending across said frame, an arm secured to said shaft and supporting one of said wheels, a sleeve loose on said shaft and supporting the other wheel, and a single lever directly connected with one of said members for rotating both, the shaft and sleeve, simultaneously and in opposite directions.

3. The combination with the frame, and a pair of ground-wheels for supporting one end thereof, of a shaft extending across said frame, an arm secured to said shaft and supporting one of said wheels, a sleeve loose on said shaft and supporting the other wheel, and reverse-gearing between said shaft and sleeve, and a lever directly connected with one of said members for rotating both, the shaft and sleeve, simultaneously and in opposite directions.

4. The combination with the frame, and a pair of ground-wheels for supporting one end thereof, of a shaft extending across said frame, an arm secured to said shaft and supporting one of said wheels, a sleeve loose on said shaft and supporting the other wheel, and reverse-gearing between said shaft and sleeve, and a lever directly connected with said shaft for rotating both, the shaft and sleeve, simultaneously and in opposite directions.

5. The combination with the frame, and a pair of ground-wheels for supporting one end thereof, of a shaft extending across said frame, an arm secured to said shaft and supporting one of said wheels, a sleeve loose on said shaft and supporting the other wheel, and means for rotating both, the shaft and sleeve, simultaneously and in opposite directions, a trailer, and means for positioning said trailer to correspond to one of said ground-wheels.

6. The combination with the frame, and a pair of ground-wheels for supporting one end thereof, of a shaft extending across said frame, an arm secured to said shaft and supporting one of said wheels, a sleeve loose on said shaft and supporting the other wheel, and means for rotating both, the shaft and sleeve, simultaneously and in opposite directions, a trailer, a swinging-arm connecting the same with the frame, and means for positioning said trailer to correspond to one of said ground-wheels.

7. The combination with the frame, and a pair of ground-wheels for supporting one end thereof, of a shaft extending across said frame, an arm secured to said shaft and supporting one of said wheels, a sleeve loose on said shaft and supporting the other wheel, and means for rotating both, the shaft and sleeve, simultaneously and in opposite directions, a trailer, a swinging-arm connecting the same with the frame, and a sprocket-and-chain connection for positioning said trailer to correspond to one of said ground-wheels.

In testimony whereof I affix my signature in presence of two witnesses.

RUDOLPH E. SUCHOLTZ.

Witnesses:
C. R. STICKNEY,
OTTO F. BAUHET.